(12) United States Patent
Sams

(10) Patent No.: US 7,586,493 B1
(45) Date of Patent: Sep. 8, 2009

(54) SYSTEM AND METHOD FOR OFFLOADING APPLICATION TASKS IN A MULTI-PROCESSOR ENVIRONMENT UTILIZING A DRIVER

(75) Inventor: Rudy Jason Sams, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 450 days.

(21) Appl. No.: 11/441,432

(22) Filed: May 24, 2006

(51) Int. Cl.
*G06F 15/16* (2006.01)
*G06F 15/80* (2006.01)
*G06F 13/14* (2006.01)
*G06T 1/00* (2006.01)

(52) U.S. Cl. ............... 345/502; 345/503; 345/504; 345/505; 345/520; 345/522

(58) Field of Classification Search ......... 345/502–505, 345/520, 522
See application file for complete search history.

(56) References Cited

U.S. PATENT DOCUMENTS 7,234,144 B2 * 6/2007 Wilt et al. ................. 718/104

* cited by examiner

*Primary Examiner*—Hau H Nguyen
(74) *Attorney, Agent, or Firm*—Zilka-Kotab, PC

(57) ABSTRACT

A system, method, and computer program product are provided for offloading application tasks in a multi-processor environment. In use, an application is executed utilizing a first processor. Such application performs a plurality of tasks. A driver is provided for determining at least a subset of the tasks. To this end, the subset of tasks may be executed utilizing a second processor.

19 Claims, 6 Drawing Sheets

SYSTEM AND METHOD FOR OFFLOADING APPLICATION TASKS IN A MULTI-PROCESSOR ENVIRONMENT UTILIZING A DRIVER

FIELD OF THE INVENTION

The present invention relates to application-related processing, and more particularly to executing application tasks.

BACKGROUND

Traditionally, graphics applications (e.g. games, computer aided drafting programs, etc.) as well as other applications are configured to execute in single processor environments. Specifically, the applications themselves are executed by a single processor. Further, during such execution, the applications perform a plurality of application-specific tasks, which are also executed by the single processor.

These tasks are typically carried out by the application using calls to a particular application program interface (API), in the form of API calls. In response to such API calls, a driver is configured to execute each API call utilizing the single processor which is executing the application. Thus, both the application itself, as well as the API calls, are executed on the single processor, during use.

Recently, many computing environments have been designed to include multiple processors for the purpose of making additional computing resources available to applications, etc. Unfortunately, however, drivers have typically not been updated to accommodate such multiple-processor environments, particularly in the realm of graphics applications. Thus, in the context of the example provided hereinabove, a traditional driver would simply assign the API calls to the same processing thread (associated with a single processor) by which the application is being executed. To this end, multiple processor environments are often not leveraged to the extent possible.

There is thus a need for overcoming these and/or other problems associated with the prior art.

SUMMARY

A system, method, and computer program product are provided for offloading application tasks in a multi-processor environment. In use, an application is executed utilizing a first processor. Such application performs a plurality of tasks. A driver is provided for determining at least a subset of the tasks. To this end, the subset of tasks may be executed utilizing a second processor.

DETAILED DESCRIPTION

Figure 1:
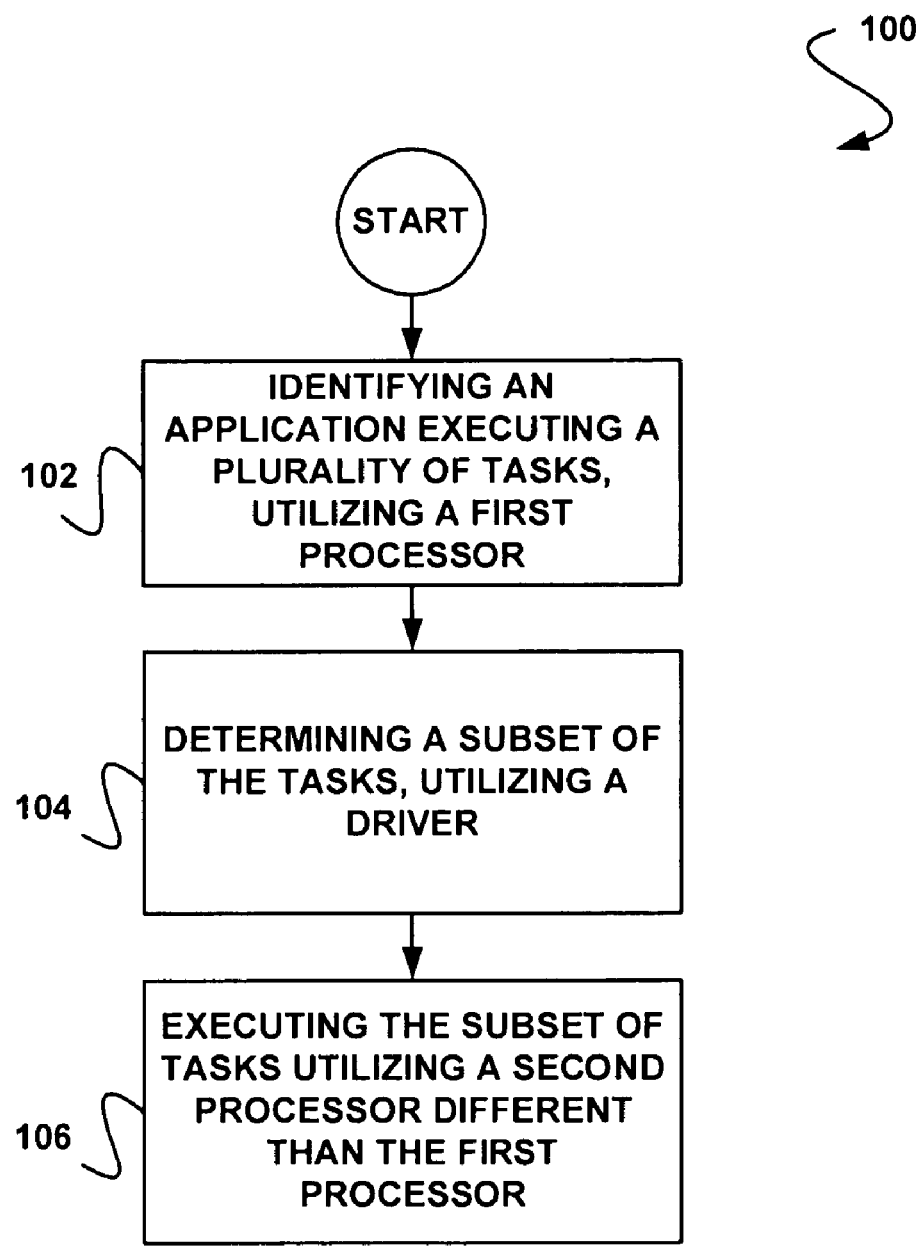
FIG. 1 shows a method for offloading application tasks in a multi-processor environment, in accordance with one embodiment.

FIG. 1 shows a method 100 for offloading application tasks in a multi- processor environment, in accordance with one embodiment. As shown, an application that is performing a plurality of tasks is identified. Note operation 102. In the context of the present description, such application may include any computer code (e.g. graphics-related, non-graphics-related, etc.), and the tasks may include any actions, processes, etc. that are associated with the execution of the application.

Further, such application is executed utilizing a first of two or more processors. It is important to note that, in the present description, the term processor may refer to a central processing unit (CPU); graphics processor; network processor; any one of multiple components, modules, threads, cores, etc. of a single processor or single semiconductor platform; and/or any other hardware (and possibly inclusive of software) that is capable of any desired processing. Still yet, the terms "first," "second," etc. used throughout the present description should be construed as mere identifiers used to facilitate a description of the processors. Of course, such terms are not intended to imply any sort of order, etc.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional processor and bus implementation.

Also during use, a driver determines at least a subset of the tasks. See operation 104. Such subset (or more) may be determined in any desired manner that results in the identification thereof for processing in accordance with the next operation. More information regarding one possible manner in which such determination may be made will be set forth during subsequent figures. Still yet, the driver may include any software that operates to interact with a particular device (e.g. a graphics processor, network processor, any of the additional examples mentioned hereinabove, etc.). In one embodiment, the driver optionally employs various knowledge of the device and/or an interface that an application using the driver does not necessarily have. In still other embodiments, the driver may be packaged as a dynamic link library (DLL) file.

To this end, the subset of tasks may be executed utilizing a second processor, as indicated in operation 106. Again, the second processor may include any processor that meets the above definition. Further, it should be noted that the second processor may be of a type that is the same, similar, or different than that of the first processor.

Thus, by operating in the manner set forth in operation 104, the driver may facilitate the optional leverage of more than one processor when executing an application, in a multi-processor environment. More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
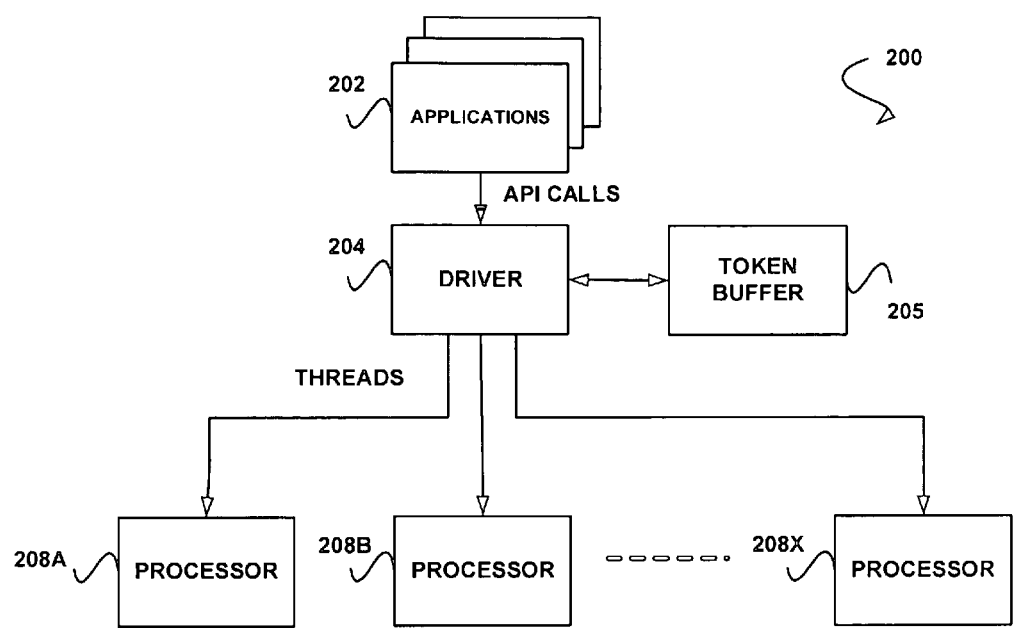
FIG. 2 shows a system for offloading application tasks, in accordance with another embodiment.

FIG. 2 shows a system 200 for offloading application tasks, in accordance with one embodiment. As an option, the present system 200 may be implemented to carry out the method 100 of FIG. 1. Of course, however, the system 200 may be implemented in any desired environment. It should also be noted that the previous definitions apply in the context of the description of the present figure.

As shown, a plurality of applications 202 are provided which may include the same or different applications relating to graphics, networking, general computing, and/or any other type of computing. Further included is a driver 204 which receives API calls from the applications, for the purpose of executing tasks related to such applications.

For reasons that will soon become apparent, a token buffer 205 is also included. Such token buffer 205 communicates with the driver 204 for buffering tokens associated with the API calls, during use. In the context of the present description, such tokens may refer to any data structure that is capable of representing at least one API call received from one or more applications.

Still yet, a plurality of processors 208A, 208B, through 208X are provided for processing different (or the same) tasks simultaneously in parallel. Such execution may be carried out utilizing a plurality of threads, in the manner shown. It should be further noted that at least one of such processors 208A, 208B, through 208X is adapted for executing one or more of the applications 202 during use.

Thus, in operation, the driver 204 is capable of storing the API calls received from the applications 202 in the form of tokens in the token buffer 205. Further, in a manner that will be elaborated upon later, tasks associated with such tokens are executed using one or more of the processors 208A, 208B, through 208X other than the processor that is being relied upon to execute the associated application(s) 202 from which the tasks originated. More information will now be set forth regarding one exemplary method of operation associated with the driver 204 and processors 208A, 208B, through 208X.

Figure 3:
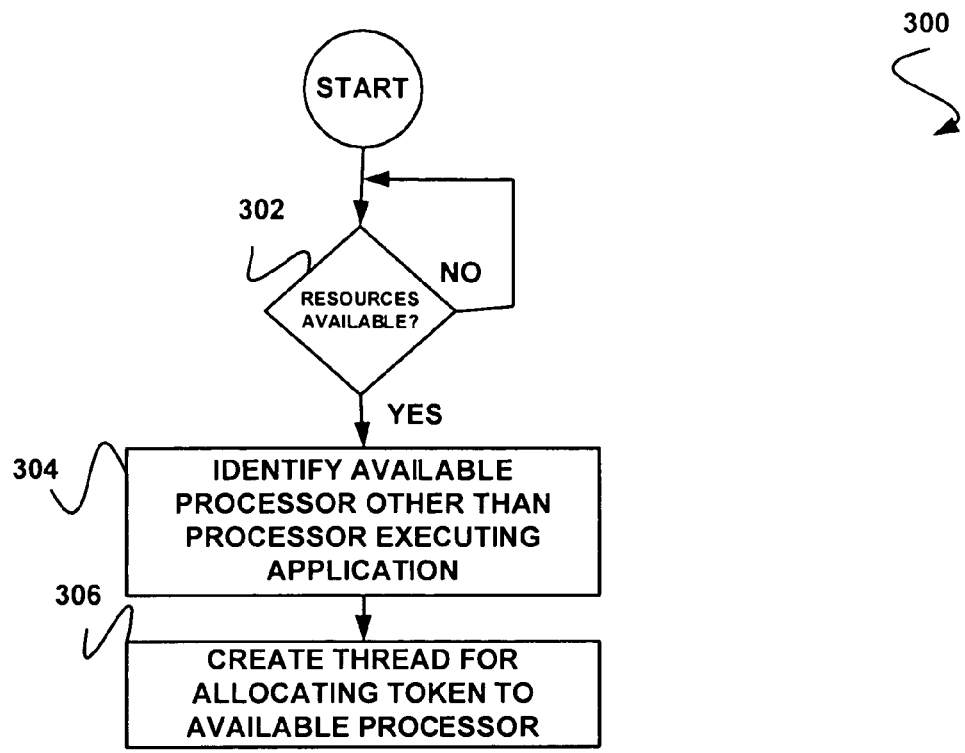
FIG. 3 shows a method for offloading application tasks utilizing a driver, in accordance with yet another embodiment.

FIG. 3 shows a method 300 for offloading application tasks utilizing a driver, in accordance with one embodiment. As an option, the present method 300 may be carried out by the system 200 of FIG. 2, and further represent one exemplary implementation of the method 100 of FIG. 1. Of course, however, the method 300 may be implemented in any desired environment. It should also be noted that the previous definitions apply in the context of the description of the present figure.

Initially, it is determined, in decision 302, as to whether any resources are available for offloading application tasks, in the manner described above. Specifically, in an embodiment where a first processor is executing an application, the decision 302 may revolve around whether a second processor is available. As shown, the present method 300 may poll until such decision 302 is answered affirmatively.

If it is determined in decision 302 that resources are available for offloading application tasks, such additional resources (e.g. the second processor, etc.) may be identified. See operation 304. Further, upon such identification, a thread may be created for allocating at least one token to such additional processor. See operation 306.

In one embodiment, in the context of the embodiment of FIG. 1, the determining and the executing of operations 104 and 106 may thus be conditionally performed. Specifically, such operations may be performed based on whether it is determined that the second processor is available, per decision 302 or the like. More information will now be set forth regarding another illustrative possible embodiment whereby a thread may be created for allocating a token to the aforementioned additional processor.

Figure 4:
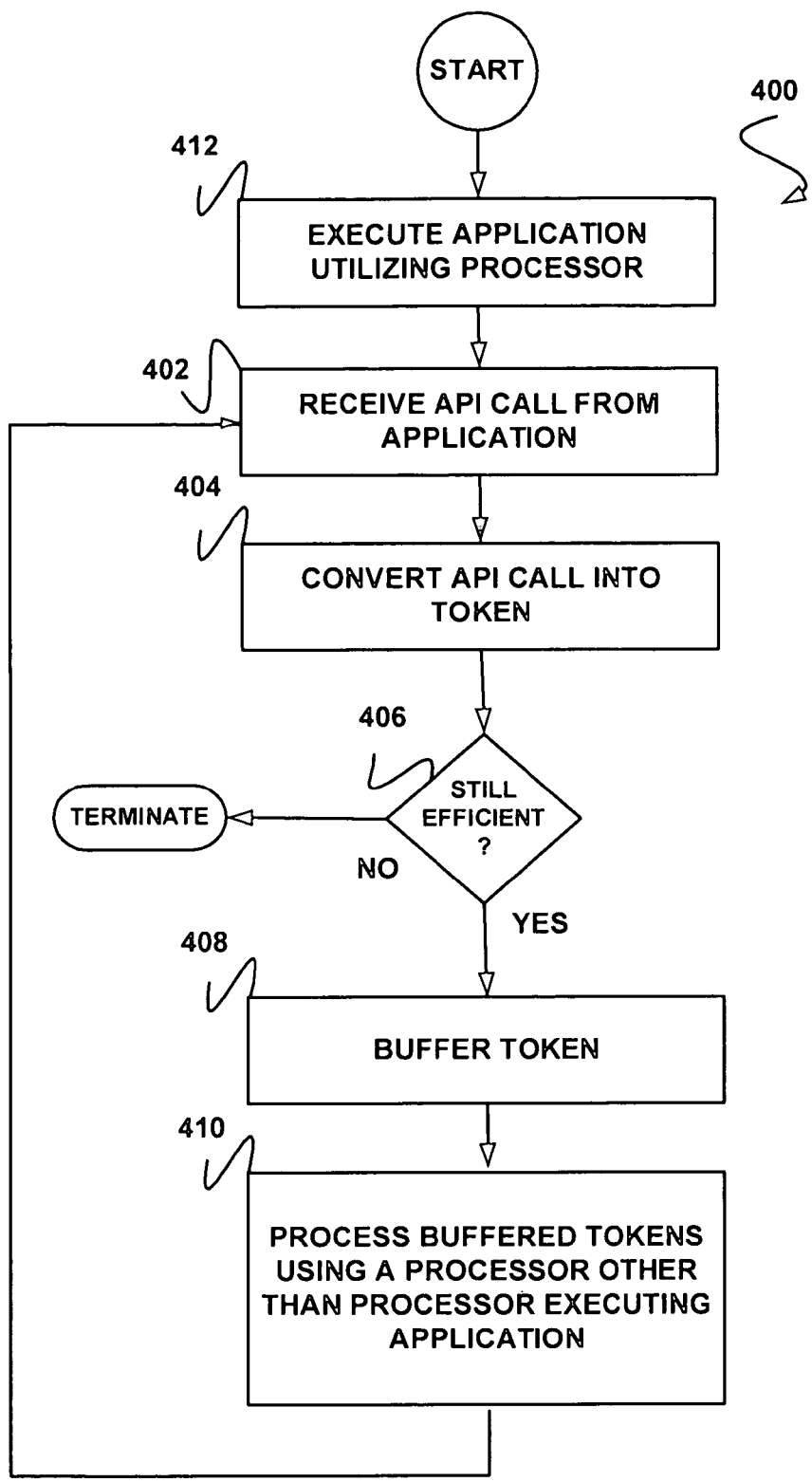
FIG. 4 shows a method for offloading application tasks by tokenizing API calls, in accordance with one embodiment.

FIG. 4 shows a method 400 for offloading application tasks by tokenizing API calls, in accordance with one embodiment. As an option, the present method 400 may be carried out by the system 200 of FIG. 2, and further represent one exemplary implementation of the operation 306 of FIG. 3. Of course, however, the method 400 may be implemented in any desired environment. Yet again, it should also be noted that the previous definitions apply in the context of the description of the present figure.

As shown, the execution of the application is carried out utilizing a first processor. Note operation 412. Further, an API call is received at a driver (e.g. see, for example, the driver 204, etc.) from an application [e.g. see, for example, the application(s) 202, etc.]. See operation 402. As an option, the API call may, in an embodiment involving a graphics application, include an OpenGL® API call. In such embodiment, the API call may request to process (e.g. move, add, delete, light, etc.) an object to be rendered, and/or request any other type of graphics-related processing, etc.

Thereafter, in operation 404, such API call is converted into a token. One exemplary data structure associated with such a token is set forth in Table 1.

TABLE 1

Dword_1 [includes enumerant that describes a command, and size/number of Dword(s) to follow]
Dword_2 (includes value to be subject of the command; may potentially be repeated)

Of course, such token is set forth for illustrative purposes only and should not be construed as limiting in any manner. For example, any desired data structure capable of being buffered may be employed. Further, more than two Dwords may be included, etc. depending on the command, etc.

Before the method 400 continues in the potential aforementioned offloading of the handling of the API call, it is determined, in decision 406, as to whether it is still efficient to carry out the offloading. If it is not, the current method 400 may be terminated, thus requiring the API call to be handled by the same processor as that on which the application is running.

Of course, the decision 406 may be carried out (if at all) utilizing any one or more desired variables. For example, in one embodiment, it may be determined whether a total processor usage is significantly greater than a predetermined processor usage. Such predetermined processor usage may be a sum of time spent playing tokens back and time spent waiting for the next API call to be tokenized.

Thus, if the total processor usage is significantly greater than such predetermined processor usage, the method 400 may be terminated at decision 406, in order to accommodate a situation where a system is running a high load and there is substantial processor usage unknown to the driver. In another embodiment, situations may arise where tokens require synchronization between a tokenizer and an associated token processor. High numbers of such type of tokens may also prompt a bail out of the method 400.

In other embodiments, the decision 406 may be answered affirmatively based on the API call represented by the received token. For example, Table 2 illustrates API calls that may be suitable for acceleration by virtue of being operated upon in a separate thread.

TABLE 2 any entry point that takes only values (and does not return a value)
any entry point that returns a value (e.g. "get," "gen" functions, etc.)
glFlush since there is no "kickoff" of the software pipeline
complex functions (e.g. glTexImage2d, glBufferData, etc.) may or may not be accelerated Again, such list is set forth for illustrative purposes only and should not be construed as exhaustive and/or limiting in any manner. In some embodiments, some token types may not be accelerated. Such tokens may include those that return a value, since the system is forced to wait for a processing thread to process the token and generate the return value. This value may be handed back through a small return buffer. When the functions that create tokens identify a non-accelerated token type, such functions may wait for an associated worker to complete processing, optionally retrieve the return value, and then return back to the application.

In any case, it may be determined whether the execution of a subset of tasks would exhibit a predetermined amount of efficiency. Further, offloading may be conditionally performed based on whether the execution of the subset of tasks exhibits a predetermined amount of efficiency.

On the other hand, if it is still efficient to carry out the offloading per decision 406, the token is buffered in operation 408 in a buffer (e.g. see, for example, the token buffer 205, etc.). To this end, the tokens buffered in the token buffer may be processed by a different processor, in accordance with operation 410. In other words, the token associated with the API call received in operation 402, which represents a subset of the various tasks being carried out by the application (or a portion thereof), may be accelerated.

By tokenizing the API calls in such a manner, the buffering is facilitated, since API calls are not readily capable of being buffered, in some embodiments. More information will now be set forth regarding one exemplary method by which the method 400 may continue by processing the tokens representative of API calls associated with various tasks.

Figure 5:
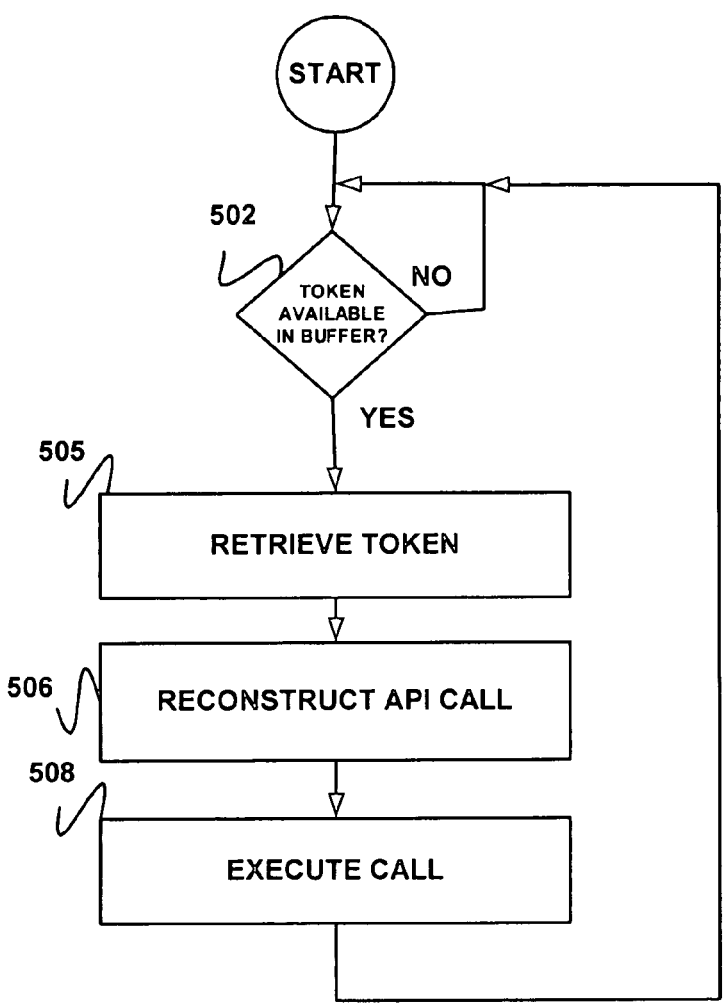
FIG. 5 shows a method for processing tokenized API calls, in accordance with one embodiment.

FIG. 5 shows a method 500 for processing tokenized API calls, in accordance with one embodiment. As an option, the present method 500 may be carried out by the system 200 of FIG. 2, and further represent one exemplary implementation of the operation 410 of the method 400 of FIG. 4. Of course, however, the method 500 may be implemented in any desired environment.

As shown, it is first determined as to whether at least one token is available in a buffer. See decision 502. By this operation, the following operations continue until all tokens have been handled. If it is determined that at least one token is available in the buffer per decision 502, the next token is retrieved per operation 505.

Such token is then used to reconstruct the associated API call. See operation 506. As mentioned earlier, the previous buffering is facilitated by virtue of tokenizing the API calls, because API calls are not readily capable of being buffered, in some embodiments.

In one embodiment, the aforementioned reconstruction may involve using the description of the API and other information (e.g. see, for example, Table 1, etc.) that may be required to identify information necessary to execute the original API call. To this end, the API call may be executed utilizing the additional processor, without necessarily burdening the original processing executing the application that initiated such API call.

Thus, a tokenizing driver may be provided that optionally improves a performance of applications when there is sufficient processing capabilities available on another processor in a computing system that is going unused. This is carried out by converting API calls into tokens that are placed into a buffer. In a graphics embodiment involving the OpenGL® API, such API calls may be encoded in more than one way depending on an OpenGL® state. In some applicable embodiments, this may address a possible problem of deciding to copy data that the API calls reference or just the reference, for example.

To this end, the driver may create a separate thread that can processes the tokens on another processor in parallel with the execution of the application(s). As an option, this may optionally reduce the burden the application places on the processor on which it is running. As a further option, use of the separate dedicated thread for handling the tokens optionally avoids various issues of needing to create new locks to protect shared data structures, etc.

Figure 6:
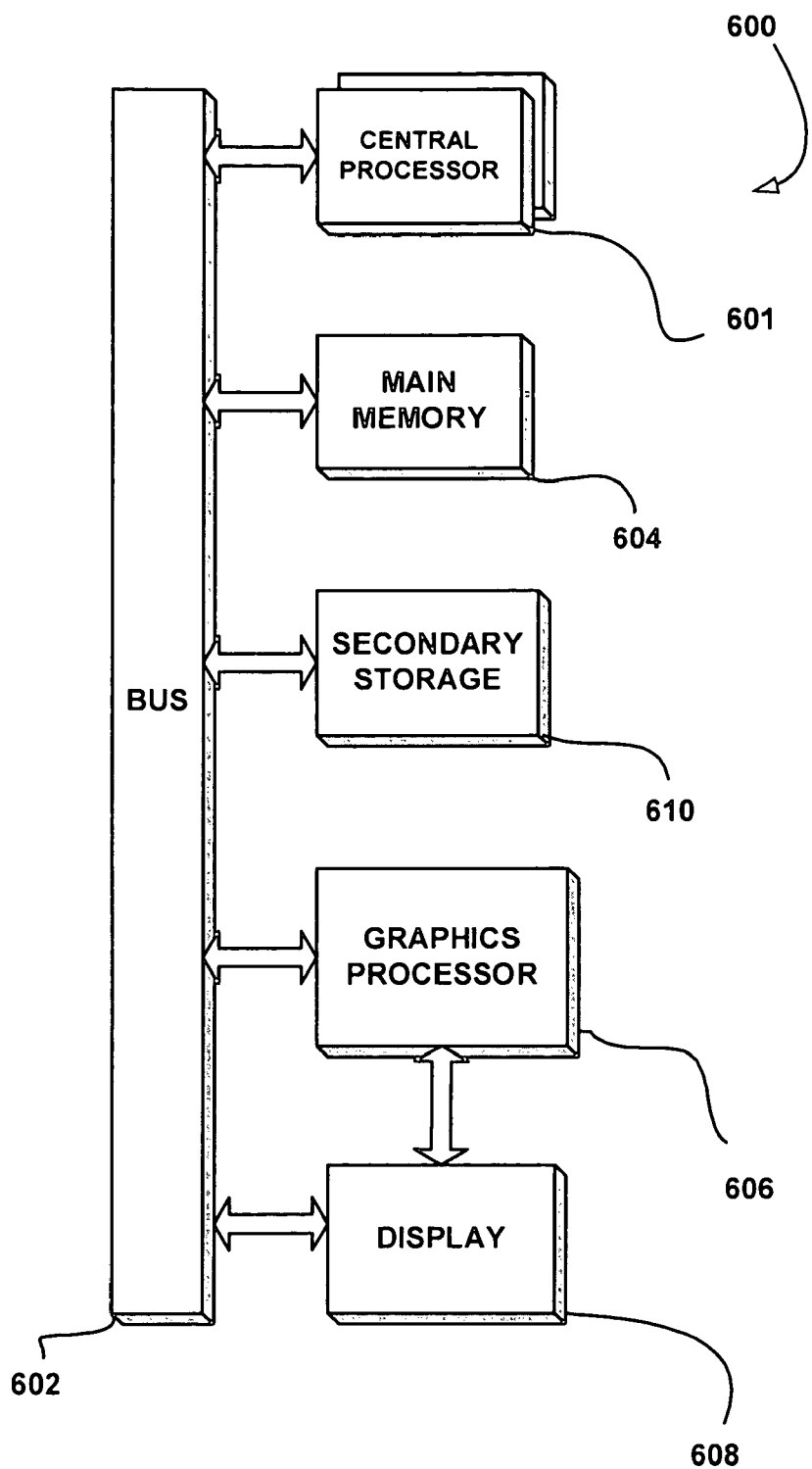
FIG. 6 illustrates an exemplary computer system in which the various architecture and/or functionality of the various previous embodiments may be implemented.

FIG. 6 illustrates an exemplary computer system 600 in which the various architecture and/or functionality of the various previous embodiments may be implemented. As shown, a computer system 600 is provided including one or more host processors 601 which are connected to a communication bus 602. The computer system 600 also includes a main memory 604. Control logic (software) and data are stored in the main memory 604 which may take the form of random access memory (RAM).

The computer system 600 also includes a graphics processor 606 and a display 608, i.e. a computer monitor. In one embodiment, the graphics processor 606 may include a transform module, a lighting module, and a rasterization module. Each of the foregoing modules may even be situated on a single semiconductor platform to form a graphics processing unit (GPU).

The computer system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 604 and/or the secondary storage 610. Such computer programs, when executed, enable the computer system 600 to perform various functions. Memory 604, storage 610 and/or any other storage are possible examples of computer-readable media.

In one embodiment, the architecture and/or functionality of the various previous figures may be implemented in the context of the host processor(s) 601, graphics processor 606, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:
identifying an application performing a plurality of tasks, the application being executed utilizing a first processor;
determining at least a subset of the tasks, utilizing a driver;
executing the subset of the tasks utilizing a second processor different than the first processor; and
determining whether the execution of the subset of the tasks exhibits a predetermined amount of efficiency;
wherein the determining whether the execution of the subset of the tasks exhibits the predetermined amount of efficiency includes determining whether a total processor usage is significantly greater than a predetermined processor usage, the predetermined processor usage including a sum of time spent playing tokens back and time spent waiting for a next API call from the application to be tokenized.

2. The method as recited in claim 1, wherein the application includes a graphics application.

3. The method as recited in claim 1, wherein at least one of the first processor and the second processor includes a central processing unit.

4. The method as recited in claim 1, wherein at least one of the first processor and the second processor includes a graphics processor.

5. The method as recited in claim 1, wherein the first processor and the second processor each includes one of a plurality of processor modules embodied on a single semiconductor platform.

6. The method as recited in claim 1, wherein it is determined whether the second processor is available.

7. The method as recited in claim 6, wherein the determining and the executing are conditionally performed based on whether it is determined that the second processor is available.

8. The method as recited in claim 1, wherein at least a portion of the tasks are performed in response to application program interface (API) calls.

9. The method as recited in claim 8, wherein the API calls includes OpenGL.

10. The method as recited in claim 8, wherein the API calls are converted into tokens.

11. The method as recited in claim 10, wherein the tokens are buffered.

12. The method as recited in claim 11, wherein the subset of the tasks are executed utilizing the second processor by determining whether at least one token is available in a buffer.

13. The method as recited in claim 12, wherein the at least one token is retrieved, if it is determined whether the at least one token is available in the buffer.

14. The method as recited in claim 13, wherein the at least one token is converted into an associated API call.

15. The method as recited in claim 14, wherein the associated API call is executed.

16. The method as recited in claim 1, wherein the determining and the executing are conditionally continued based on whether the execution of the subset of the tasks exhibits the predetermined amount of efficiency.

17. A computer program embodied on a computer readable medium tangible, comprising:
computer code for identifying an application performing a plurality of tasks, the application being executed utilizing a first processor;
computer code for determining at least a subset of the tasks, utilizing a driver;
computer code for executing the subset of the tasks utilizing a second processor different than the first processor; and
computer code for determining whether the execution of the subset of the tasks exhibits a predetermined amount of efficiency;
wherein the computer program is operable such that the determining whether the execution of the subset of the tasks exhibits the predetermined amount of efficiency includes determining whether a total processor usage is significantly greater than a predetermined processor usage, the predetermined processor usage including a sum of time spent playing tokens back and time spent waiting for a next API call from the application to be tokenized.

18. A system, comprising:
a first processor for executing an application performing a plurality of tasks;
a driver in communication with the first processor, the driver for determining at least a subset of the tasks and for determining whether an execution of the subset of the tasks exhibits a predetermined amount of efficiency; and
a second processor in communication with the driver, the second processor for the executing of the subset of the tasks;
wherein the driver is operable such that the determining whether the execution of the subset of the tasks exhibits the predetermined amount of efficiency includes determining whether a total processor usage is significantly greater than a predetermined processor usage, the predetermined processor usage including a sum of time spent playing tokens back and time spent waiting for a next API call from the application to be tokenized.

19. The system as recited in claim 18, wherein at least one of the first processor and the second processor is in communication with a display via a bus.

* * * * *